United States Patent [19]
Keller

[11] Patent Number: 6,138,857
[45] Date of Patent: Oct. 31, 2000

[54] FUEL TANK AND METHOD FOR THE MOUNTING OF LINES IN A FUEL TANK

[75] Inventor: Dieter Keller, Aschaffenburg, Germany

[73] Assignee: Mannesmann VDO AG, Frankfurt, Germany

[21] Appl. No.: 09/450,627

[22] Filed: Nov. 30, 1999

[30] Foreign Application Priority Data

Dec. 1, 1998 [DE] Germany ............ 198 55 387

[51] Int. Cl.⁷ .................................................. B65D 25/00
[52] U.S. Cl. .................... 220/495.01; 220/86.2; 220/562
[58] Field of Search .............. 220/495.01, 562, 220/4.14, 4.15, 86.1, 86.2, 86.3

[56] References Cited

U.S. PATENT DOCUMENTS

| | | | |
|---|---|---|---|
| 1,874,008 | 8/1932 | Henig | 220/86.1 X |
| 2,115,016 | 4/1938 | Ehlers | 220/86.2 |
| 2,165,357 | 7/1939 | Emmert | 220/86.2 |
| 2,548,734 | 4/1951 | Mathey | 220/86.2 |
| 4,124,137 | 11/1978 | Hesse et al. | 220/86.1 |
| 4,224,167 | 9/1980 | Buttigieg | 220/86.2 X |
| 4,739,808 | 4/1988 | Schmidt | 220/86.2 X |
| 5,343,902 | 9/1994 | Ramioulle | 220/86.2 X |
| 5,979,511 | 11/1999 | Ono | 220/562 X |

*Primary Examiner*—Steven Pollard
*Attorney, Agent, or Firm*—Mayer, Brown & Platt

[57] ABSTRACT

Lines to be mounted on a fuel tank are prestressed against an inside of the fuel tank by means of spring elements. The mounting of the lines thereby becomes very simple, particularly in the case of fuel tanks manufactured by the blowing method. Furthermore, fuel vapors are reliably prevented from escaping from the fuel tank.

13 Claims, 3 Drawing Sheets

FUEL TANK AND METHOD FOR THE MOUNTING OF LINES IN A FUEL TANK

BACKGROUND OF THE INVENTION

1. Field of the Invention

The invention relates to a fuel tank for a motor vehicle, with a plurality of lines provided for its ventilation or for feeding fuel. The invention relates, furthermore, to two methods for the mounting of lines in a fuel tank, one of the fuel tanks being manufactured by the blowing method and the other fuel tank by assembling two moldings.

2. Description of Related Art

Present-day fuel tanks for motor vehicles are usually plastic parts of complicated shape and have a plurality of angled portions or chambers. The fuel tanks require a multiplicity of lines for ventilating them during refueling or during operation or for feeding fuel by means of suction jet pumps between the various chambers. The lines are laid partly within the fuel tank and partly, to make mounting simpler, on the outside of the fuel tank and are fastened permanently.

One disadvantage of the known fuel tanks is that the fastening of the lines to the inside of the wall of the fuel tank is highly complex or, in the case of fuel tanks of particularly complicated shape, is often not possible. In practice, this problem is overcome, by first leading the lines outward and at other points leading them back into the fuel tank again. As a result of this, however, the fuel tank is complicated to mount because of the multiplicity of parts and has a large number of sealing points. Fuel vapors may escape through the sealing points. Furthermore, for example, if the motor vehicle is in an accident, the lines may break off from the fuel tank.

SUMMARY OF THE INVENTION

The purposes and advantages of the invention will be set forth in and apparent from the description and drawings that follow, as well as will be learned by practice of the invention. Additional advantages of the invention will be realized and attained by the elements of the fuel tank particularly pointed out in the appended claims.

The problem on which the invention is based is to design a fuel tank of the type initially mentioned, in such a way that it can be mounted particularly simply and that fuel vapors are largely prevented from escaping. Furthermore, two methods, which are as simple as possible, for mounting the lines in the fuel tank are to be provided.

The first mentioned problem is solved, according to the invention, in that the lines are prestressed against the inside of the wall of the fuel tank by means of at least one spring element.

By virtue of this design, the lines are held within the fuel tank by the spring element. There is, therefore, frequently no need for additional fastening of the lines to the inside of the fuel tank. In the simplest case, the lines can be introduced, together with the prestressed spring element, into the fuel tank through an orifice which is present in any case for a feed unit. In the fuel tank, the spring element prestresses the lines against the wall. Since, by virtue of the invention, the lines no longer have to be led out of the fuel tank and then back in again, they are protected in a particularly reliable way, for example if the motor vehicle is in an accident. Furthermore, the sealing points and connections of the lines are located within the fuel tank, so that an escape of fuel vapors from the fuel tank is reliably avoided. In order to equalize the prestressing of the lines, a plurality of spring elements may, of course, be provided.

Usually, the lines are connected to a baffle arranged in the fuel tank or to suction jet pumps or the lines have valves. According to an advantageous development of the invention, the mounting of the lines on such components to be arranged in the fuel tank can be carried out in a simple way outside the fuel tank, if components connected to the lines and arranged inside the fuel tank are prestressed against the inside of the wall of the fuel tank by the spring element.

According to another advantageous development of the invention, the lines are held permanently in their intended position if the lines are fastened positively to the inside of the wall.

According to another advantageous development of the invention, the positive fastening of the lines to the inside of the fuel tank is particularly simple in design terms if the wall of the fuel tank has depressions for receiving the lines or the components connected to the lines. After the lines have been introduced into the fuel tank, moreover, the lines or the components connected to the lines can be engaged in the depressions in a simple way by being moved back and forth slightly.

The spring element may have virtually any desired design in conformity with the shape of the fuel tank. The spring element may, for example, have rigid and flexible portions and be of one-part or multipart design. However, according to an advantageous development of the invention, the spring element has a very large spring excursion and, moreover, can be produced particularly cost-effectively if it is designed in the form of a clip.

A contribution to further simplifying the mounting of the fuel tank according to the invention is made if a plurality of the lines form a structural unit. As a result of this, moreover, the number of spring elements necessary for prestressing is kept particularly small.

A contribution to reducing the manufacturing costs of the fuel tank according to the invention is made if the lines are manufactured from the same material as the fuel tank. Furthermore, the lines thereby have high inherent stability, so that only very few spring elements are necessary for prestressing them. Another advantage of this design is that incompatibilities of different materials are ruled out.

The manufacturing costs of the fuel tank according to the invention are further reduced if the spring element is manufactured from the same material as the fuel tank.

A contribution to further simplifying the mounting of the fuel tank according to the invention is made if the spring element is manufactured in one piece with the lines.

The second mentioned problem, specifically the provision of a first particularly simple method for the mounting of lines in a fuel tank which is produced by the heating together with subsequent swelling of a tubular blank within a mold, is solved, according to the invention, the lines are fastened to at least one spring element, the spring element is subsequently compressed and introduced together with the lines into the blank, and in that, after relaxation of the spring element, the fuel tank is produced by heating together with subsequent swelling.

By means of this method, virtually any desired number of lines and other components connected to the lines, such as, for example, suction jet pumps and valves, can be arranged within the fuel tank. During the swelling process, the lines and the components connected to the lines are reliably prestressed against the inside of the wall of the fuel tank by the spring elements. When the fuel tank is in the swollen state, the lines and the components are then held in their intended positions. This method leads to particularly low manufacturing costs, especially where large quantities of fuel tanks are concerned.

The problem of providing a second particularly simple method for the mounting of lines in a fuel tank which is produced by assembling two moldings is solved, according to the invention, in that the lines are fastened to at least one spring element, in that part of the lines and/or of the spring element is fastened to the inside of one of the moldings, and in that the moldings are subsequently assembled counter to the force of the spring element.

The mounting of the fuel tank is thereby simplified in so far as the lines have to be fastened to only one of the moldings. After the moldings have been assembled, the lines and components connected to the lines are held on the second molding by the spring elements. By means of this method, the lines and components connected to them can be positioned particularly accurately in the fuel tank.

According to an advantageous development of the invention, the lines are fastened to the inside of the wall particularly reliably if the lines and/or the spring element are welded or adhesively bonded to the inside of the wall of the fuel tank after the assembly of the moldings or the swelling of the fuel tank. Since the lines are in any case braced by the spring elements in the fuel tank, only very few welds or spots of adhesive are required according to the invention. In this case, welding can be carried out, for example, by means of a laser beam.

According to another advantageous development of the invention, the lines can be positively connected, with particularly low outlay, to the fuel tank manufactured from thermally deformable material, if, after the assembly of the moldings or the swelling of the fuel tank, fuel tank wall regions against which the lines are prestressed are heated and subsequently subjected to plastic deformation in order to make a positive connection of the wall to the lines. This plastic deformation can be carried out, for example, by means of hot tongs.

BRIEF DESCRIPTION OF THE DRAWINGS

An exemplary embodiment of the invention will be explained in more detail in the following text with reference to the drawings. The drawings are incorporated in and constitute part of this specification. The invention permits numerous embodiments. In order to make its basic principle even clearer, one of these is illustrated in the drawings and is described below. In the drawings.

DETAILED DESCRIPTION OF THE INVENTION

Figure 1A:
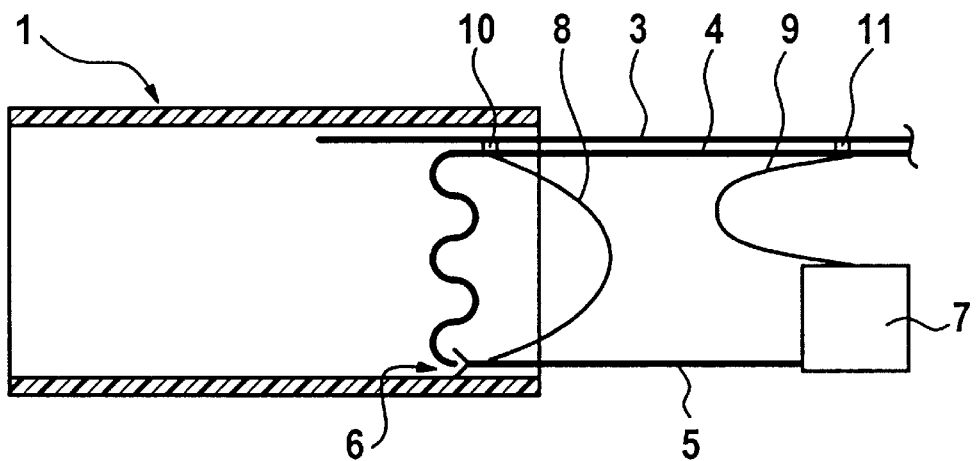
FIGS. 1a and 1b show diagrammatically a method according to the invention for producing a fuel tank by the blowing method.
Figure 1B:
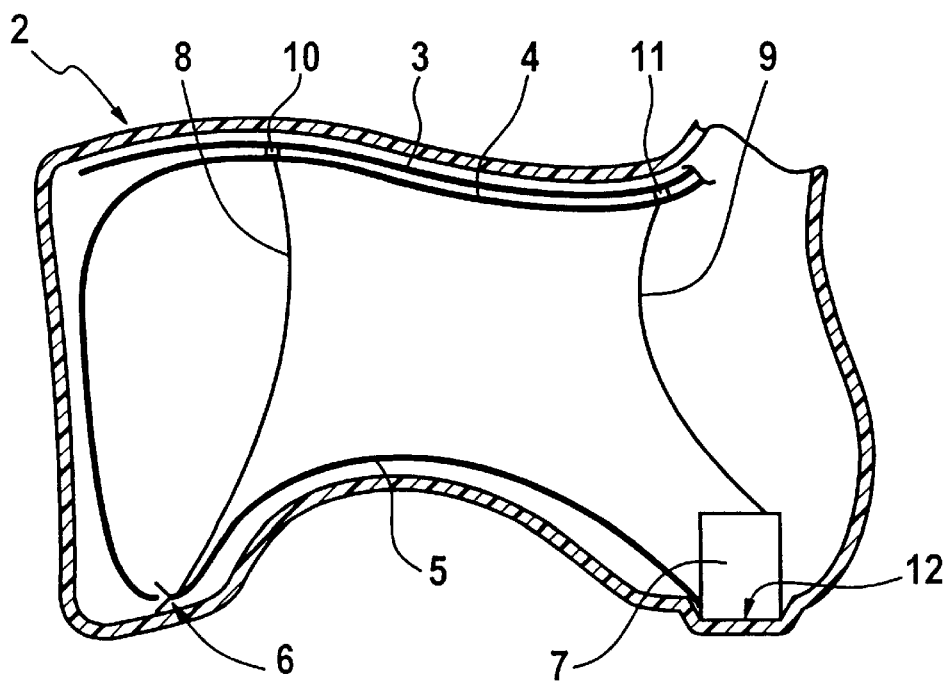

FIG. 1a shows a tubular blank 1 for a fuel tank 2 illustrated in FIG. 1b. Lines 3–5, one designed as a vent line and two as feed lines, are pushed into the blank 1. The lines 4, 5 designed as feed lines are connected to a suction jet pump 6 and to a baffle 7 and are held at a distance from one another by two spring elements 8, 9 in the form of clips. For this purpose, the spring elements 8, 9 have points of engagement on the baffle 7 and near the suction jet pump 6. Two of the lines 3, 4 are connected to one another via webs 10, 11 and thus form a structural unit. In the position illustrated in FIG. 1a, the spring elements 8, 9 are compressed. With the spring elements 8, 9 in this state, the baffle 7 and the suction jet pump 6, together with the lines 3–5, can be introduced into the blank 1, until they are located within the blank 1 and are prestressed against its inside by the spring elements 8, 9.

The blank 1 is subsequently introduced into a mold, not illustrated, heated and at the same time swollen. During the swelling process, the spring elements 8, 9 prestress the lines 3–5 outward. After cooling, the fuel tank 2 illustrated in FIG. 1b can be extracted from the mold. The lines 3–5 and the suction jet pump 6 are, in this case, prestressed permanently against the inside of the wall of the fuel tank 2 by the spring elements 8, 9. The wall of the fuel tank 2 has a depression 12 for the baffle 7.

Figure 2A:
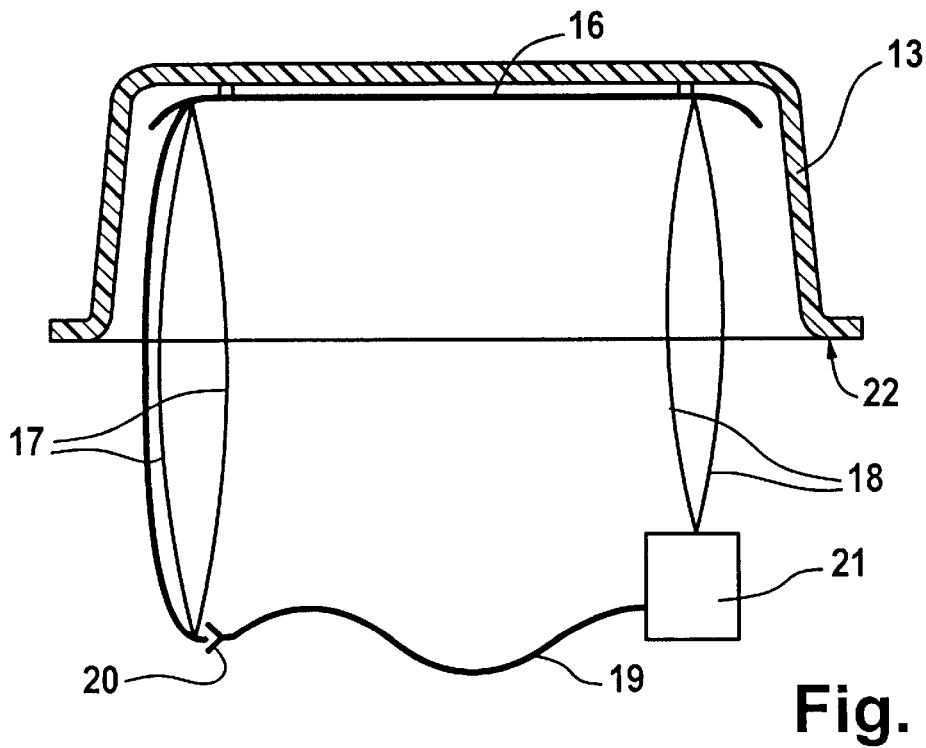
FIGS. 2a and 2b show diagrammatically a method according to the invention for producing a fuel tank from two moldings.
Figure 2B:
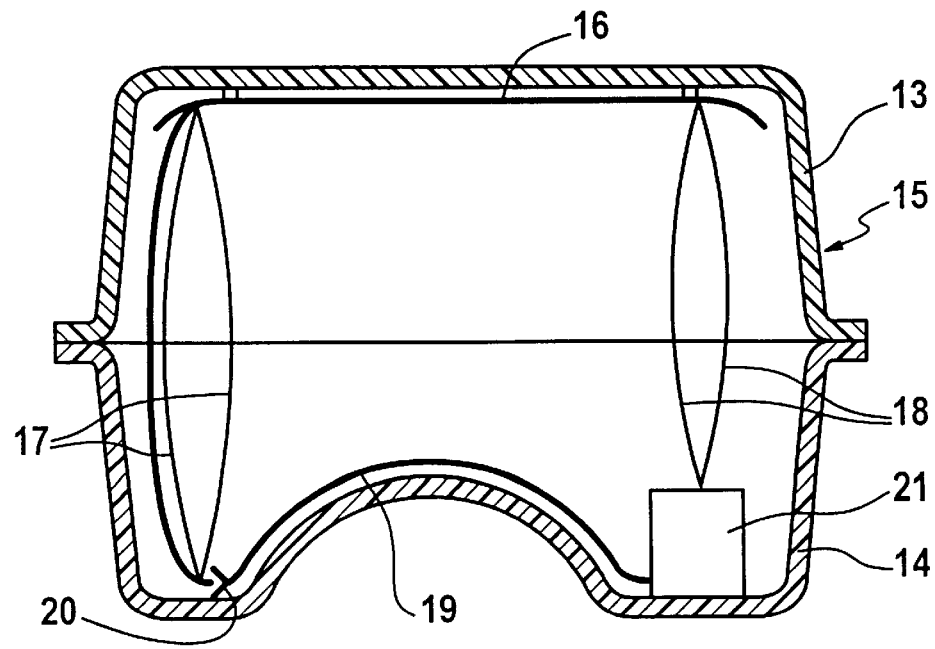

FIG. 2a shows an upper molding 13 of a fuel tank 15 illustrated in FIG. 2b and composed of two moldings 13, 14. A plurality of lines 16 for ventilation or for feeding fuel are fastened, for example by the welding method, to the upper molding 13. Spring elements 17, 18 are fastened to the upper molding 13 and with their free ends carry further lines 19 and components 20, 21. FIG. 2a illustrates the spring elements 17, 18 in the relaxed state.

The upper molding 13 has a flange 22 intended to be welded to the lower molding 14 illustrated in FIG. 2b. After the two moldings 13, 14 have been welded together, the spring elements 17, 18 are in a tensioned state. In this case, the lines 19 and the components 20, 21 in the fuel tank 15 are prestressed against the lower molding 14.

Figure 3:
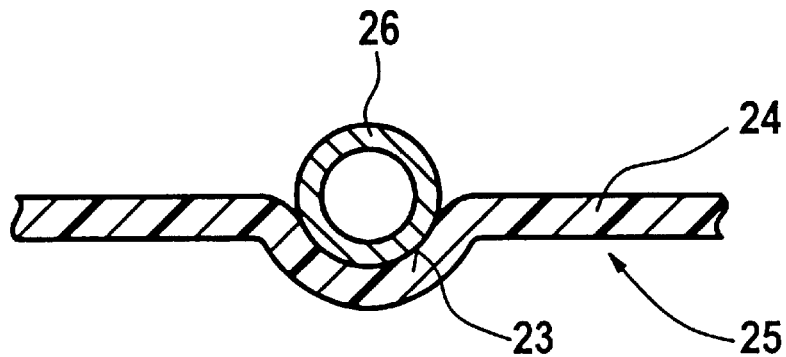
FIG. 3 shows a positive fastening of a line in a wall of a fuel tank.

FIG. 3 shows a line 26 prestressed into a depression 23 in a wall 24 of a fuel tank 25. The method by which the fuel tank 25 has been produced is of no significance here. The line 26 is positively secured against lateral movement by being braced in the depression 23.

Figure 4:
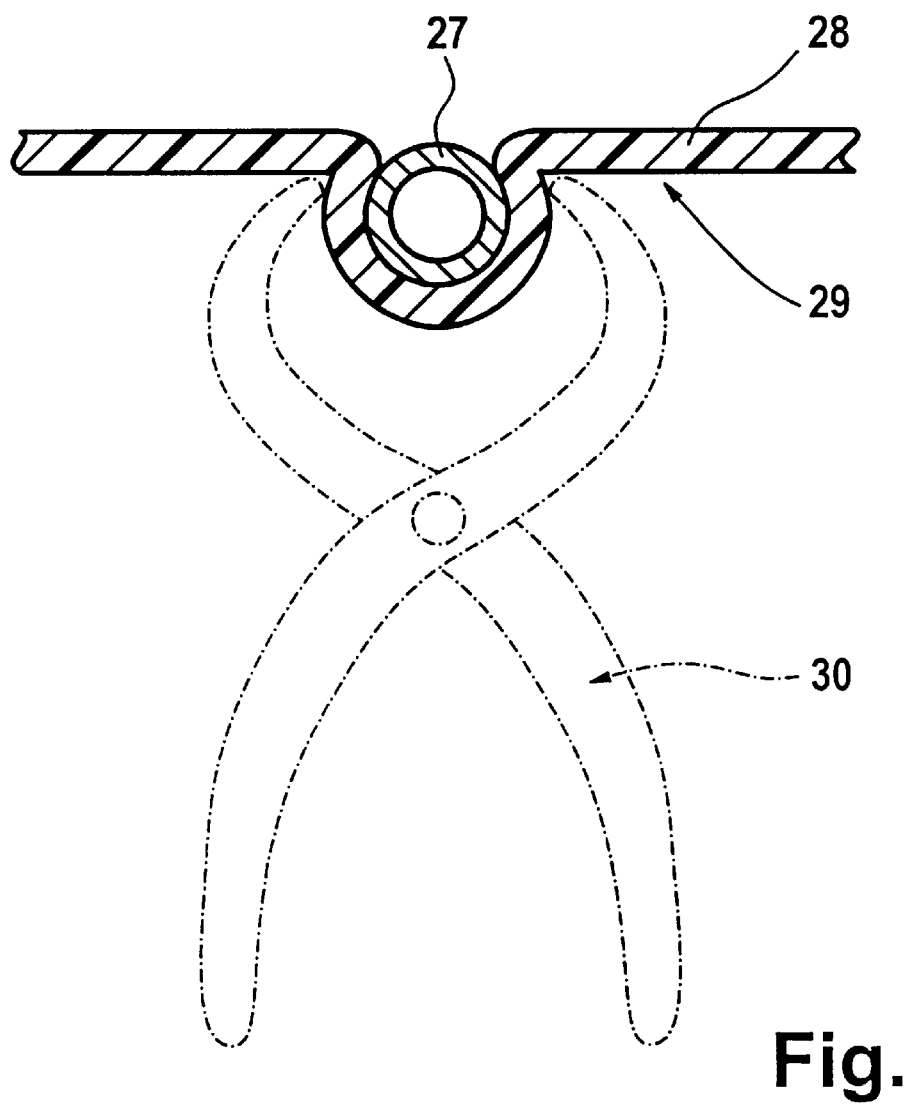
FIG. 4 shows a further embodiment of the positive fastening of a line in the wall of the fuel tank.

FIG. 4 shows a further embodiment of the positive securing of a line 27 to a thermally deformable wall 28 of a fuel tank 29. Here, the wall 28 has been softened in the region of the line 27 by heating and deformed from outside the fuel tank 29 by means of tongs 30 illustrated here by dashes and dots. After cooling, the line 27 is fastened positively to the wall 28.

Other embodiments of the invention will be apparent to those skilled in the art from consideration of the specification and practice of the invention disclosed herein. It is intended that the specification and examples of embodiments be considered as exemplary only, with the true scope and spirit of the invention being indicated by the following claims.

What is claimed is:

1. A fuel tank for a motor vehicle, with a plurality of lines provided for its ventilation or for feeding fuel, wherein the lines are prestressed against the inside of the wall of the fuel tank by at least one spring element.

2. The fuel tank as claimed in claim 1, wherein components connected to the lines and arranged inside the fuel tank are prestressed against the inside of the wall of the fuel tank by the spring element.

3. The fuel tank as claimed in claim 1, wherein the lines are fastened positively to the inside of the wall.

4. The fuel tank as claimed in claim 1, wherein the wall of the fuel tank has depressions for receiving the lines or the components connected to the lines.

5. The fuel tank as claimed in claim 1, wherein the spring element is designed in the form of a clip.

6. The fuel tank as claimed in claim 1, characterized in that a plurality of the lines form a structural unit.

7. The fuel tank as claimed in claim 1, wherein the lines are manufactured from the same material as the fuel tank.

8. The fuel tank as claimed in claim 1, wherein the spring element is manufactured from the same material as the fuel tank.

9. The fuel tank as claimed in claim 1, wherein the spring element is manufactured in one piece with the lines.

10. A method for the mounting of lines in a fuel tank which is produced by the heating together with subsequent swelling of a tubular blank within a mold, wherein the lines are fastened to at least one spring element, the spring element is subsequently compressed and introduced together with the lines into the blank, and wherein, after relaxation of the spring element, the fuel tank is produced by heating with subsequent swelling.

11. A method for the mounting of lines in a fuel tank which is produced by assembling two moldings, wherein the lines are fastened to at least one spring element, wherein part of the lines or of the spring element is fastened to the inside of one of the moldings, and wherein the moldings are subsequently assembled counter to the force of the spring element.

12. The method as claimed in claim 10, wherein the lines or the spring element are welded or adhesively bonded to the inside of the wall of the fuel tank after the assembly of the moldings or the swelling of the fuel tank.

13. A method for the mounting of lines in a thermally deformable fuel tank, as claimed in claim 10, wherein, after the assembly of the moldings or the swelling of the fuel tank, fuel tank wall regions against which the lines are prestressed are heated and subsequently subjected to plastic deformation in order to make a positive connection of the wall to the lines.

* * * * *